United States Patent [19]

Ueda

[11] Patent Number: 4,988,571

[45] Date of Patent: Jan. 29, 1991

[54] DOUBLE-LAYERED PHOTOSENSITIVE MEMBER WITH POLYCARBONATE RESIN

[75] Inventor: Hidpaki Ueda, Osaka, Japan

[73] Assignee: Minolta Camera Kabushiki Kaisha, Osaka, Japan

[21] Appl. No.: 310,605

[22] Filed: Feb. 14, 1989

[30] Foreign Application Priority Data

Feb. 15, 1988 [JP] Japan ................................. 63-32350

[51] Int. Cl.[5] ........................ B32B 27/36; G03G 5/06

[52] U.S. Cl. .................................... 428/412; 428/463; 427/250; 427/124; 427/421; 427/430.1; 430/66; 430/76; 430/84

[58] Field of Search .................. 428/442, 463; 430/84, 430/66, 76

[56] References Cited

FOREIGN PATENT DOCUMENTS 62-160458 7/1987 Japan .

*Primary Examiner*—P. C. Sluby

*Attorney, Agent, or Firm*—Burns, Doane, Swecker & Mathis

[57] ABSTRACT

The present invention relates to the photosensitive member which provides at least a charge generating layer and charge transporting layer on an electrically conductive substrate, the charge transporting layer contains a polycarbonate resin I of at least first type polycarbonate resin having a mean molecular weight of $2\text{–}4\times10^4$ and a polycarbonate resin II of at least second type polycarbonate resin having a mean molecular weight of $4\text{–}6.5\times10^4$, said polycarbonate resin I contributing between 5 and 50 parts by weight of the combined ratio of polycarbonate resins I and II.

13 Claims, No Drawings

DOUBLE-LAYERED PHOTOSENSITIVE MEMBER WITH POLYCARBONATE RESIN

BACKGROUND OF THE INVENTION

The present invention relates to a laminate layered photosensitive member having at least a charge generating layer and charge transporting layer provided on an electrically conductive substrate, and more specifically relates to a laminate photosensitive member having special characteristics employed in the formation of said charge transporting layer.

Function-separated type laminate photosenstive members have found wide acceptance in recent years because they possess certain advantages in that they can usually be manufactured by coating processes which are readily adaptable to production at low production cost, and the wavelength range of photosensitivity can be freely controlled by selecting suitable charge generating materials for use therein.

Irregular thickness of the layers in the photosenstive member, creeling defect of the photosensitive surface, and deterioration due to ozone and moisture on the image can lead to nonuniform image density in such laminate photosensitive members, so that when several hundred copies are continuously made the image density varies and the image fades.

The aforesaid problem becomes quite severe in the case of laser printers and the like which require high image reliability and stability during repeated printings, so that there is also a demand for photosensitive members suitable for use in said laser printers.

Major causes of the aforesaid problems are found in the coating of the photosensitive layer and particularly in the charge transporting layer thereof and are due, for example, to coating impurities and damage, friction and deterioration induced mechanically or by external physical force during resistance printing. It is also known that the properties of the binder resin used during formation of the charge transporting layer exert a great influence on the occurrence of the aforesaid problems.

Accordingly, there has been heretofore a wide range of research performed on the binder resins used in the charge transporting layer formation, and polycarbonate resins have found wide application as binder resins since it is well known that they are excellent in the whole range of electrophotographic properties such as wear resistance and photosensitivity.

When a single polycarbonate resin is used as a binder resin, however, the molecular weight varies by the batch. On one hand, polycarbonate resins with high molecular weights have excellent wear resistance, but it is difficult to remove toner which adheres to their surface, and image noise commonly occurs by filming development. On the other hand, polycarbonate resins with low molecular weights readily allow toner removal, but they possess poor wear resistance, and are susceptible to deterioration through exposure to ozone.

Japanese Patent Application No. 62-160458 recently proposed for use as a binder resin the use of a blend of two polycarbonate resins in suitable proportions, one resin having a mean molecular weight of $1.5\times10^4$ or less, and another having a mean molecular weight of $4.5\times10^4$ or greater.

However, when polycarbonate resin having a mean molecular weight of $1.5\times10^4$ or less is added, the material becomes partially more susceptible to wear and deterioration induced by ozone and leads to partial image noise. When polycarbonate resin having a mean moleculear weight of $4.5\times10^4$ or greater is added, the coating fluid sets readily with wide variation in viscosity which shortens pot-life. Thus, when two polycarbonate resins having widely different molecular weights are combined, it is difficult to control viscosity of the coating fluid, and coating layer uniformity suffers.

SUMMARY OF THE INVENTION

An object of the present invention is to provide a laminate photosensitive member which eliminates the previously described problems, and which is excellent in a wide range of electrophotographic properties such as cleaning characteristics, wear resistance and resistance to ozone, with a minimum of irregularity in layer thickness in the photosensitive member.

In the laminate photosensitive member of the present invention, which provides at least a charge generating layer and charge transporting layer on an electrically conductive substrate, the charge transporting layer contains a polycarbonate resin I of at least one type polycarbonate resin having a mean molecular weight of $2\text{–}4\times10^4$ and a polycarbonate resin II of at least one type polycarbonate resin having a mean molecular weight of $4\text{–}6.5\times10^4$, said polycarbonate resin I contributing between 5 and 50 parts by weight of the combined ratio of polycarbonate resins I and II.

Repeated units of one or more constituent linear polymers as expressed by, for example, the general chemical structural formula 1 below, may be employed for each of the aforesaid polycarbonate resins.

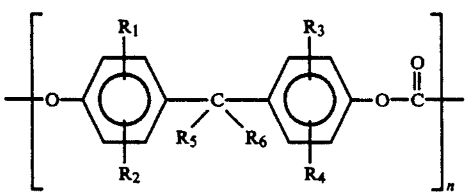
[1]

[In the formula, R1–R4 are hydrogen atoms, halogen atoms, alkyl radicals, or allyl radicals. R5 and R6 are hydrogen atoms, alkyl radicals or aromatic groups. R5 and R6 may also form combined, single cyclic structures.]

DETAILED DESCRIPTION OF THE INVENTION

Polycarbonate resins related to the present invention as expressed in general structural formula 1 may be produced by the phosgene method or other common methods of polycarbonate synthesis using one or more diol compounds as expressed by general structural formula 2 below.

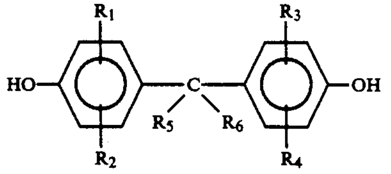
[2]

[In the formula, R1 to R6 are the same as described in formula 1.]

Chemical constituents such as those expressed, for example, by general structural formulae 3 through 6 below may be used as the repeated polycarbonate units described in formula 1.

[3]

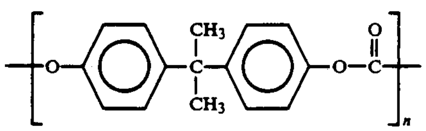

[4]

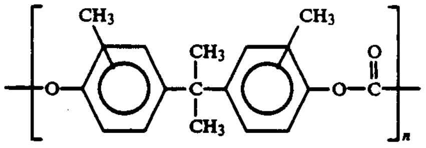

[5]

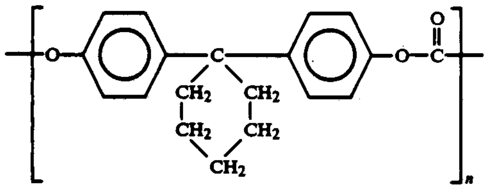

[6]

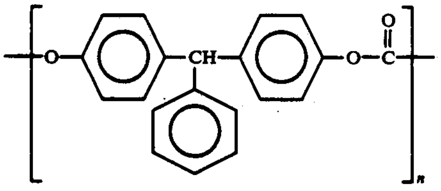

From the perspective of solubility characteristics for use in a coating fluid application, it is desirable that compounds shown in the aforesaid general formulae 4 through 6 be used as the repeated units in the polycarbonate resin.

In the present invention, at least one type of polycarbonate resin I having a mean molecular weight of $2\text{–}4\times10^4$ comprised of various of the repeated units heretofore described, and at least one type of polycarbonate resin II having a mean molecular weight of $4\text{–}6.5\times10^4$ are used in combination. From the perspectives of wear resistance, ease of controlling viscosity and pot-life, it is desirable that the difference in mean molecular weights of said polycarbonate resins I and II used in combination be $3\times10^4$ or less.

The proportions at which polycarbonate resins I and II are combined can lead to various problems. When too little polycarbonate resin I having a low mean molecular weight is used, solubility is reduced and the viscosity of the coating fluid is raised so that a suitable coating layer is unobtainable. When excess polycarbonate resin I is used, however, viscosity of said coating fluid is lowered and irregularities in layer thickness increase, leading to reduced strength and poor resistance printing characteristics.

Accordingly, in the present invention polycarbonate resin I having a mean molecular weight in the range $2\text{–}4\times10^4$ contributes between 5 and 50 parts by weight of the combined ratio of polycarbonate resins I and II, and preferably contributes 10 to 40 parts by weight of said combined ratio of polycarbonate resins I and II. The mean molecular weights of the aforesaid polycarbonate resins I and II were measured by general assay methods such as gel permeation chromatography and the like.

Hereinafter follows a concrete explanation of the formation of the laminate photosensitive member of the present invention comprised of laminated charge generating layer and charge transporting layer formed upon an electrically conductive substrate using at least one type of polycarbonate resin I having a mean molecular weight of $2\text{–}4\times10^4$ and at least one type polycarbonate resin II having a mean molecular weight of $4\text{–}6.5\times10^4$ which are combined in the previously described proportions for use as a binder resin.

The electrically conductive substrate in the photosensitive member of the present invention may comprise a steel, aluminum, silver, iron, nickel or like material formed in a drum or sheet configuration using foil or plate, or any of the aforesaid metals adhered to a plastic film or the like by means of vacuum evaporation, electroless plating or similar method, or may be formed using a coating or vacuum deposition method to similarly deposit an electrically conductive polymer, indium oxide, tin oxide or like conductive compound on a paper, plastic film or like substrate material.

A charge generating layer may be formed on the aforesaid electrically conductive substrate by depositing a charge generating material on an electrically conductive substrate by vacuum deposition or plasma polymerization process, or the charge generating material may be dispersed in a solution containing a suitable resin dissolved therein, said dispersion fluid then being applied to an electrically conductive substrate and dried thereon. The thus obtained charge generating layer will have a thickness of 0.01 to 2 μm, and preferably a thickness of 0.1 to 1 μm.

Charge generating materials suitable for use in the charge generating layer are organic pigments and dyes such as, for example, bisazo pigments, triarylmethane dyes, thiazine dyes, oxazine dyes, xanthene dyes, cyanine dyes, styryl dyes, pyrylium dyes, azo pigments, quinacridone pigments, indigo pigments, perylene pigments, polycyclic quinone pigment, bisbenzimidazole pigments, phyhalocyanine pigments and the like, and inorganic materials such as selenium seleium-arsenic, selenium-tellurium, cadmium sulfide, zinc oxide, titanium oxide, amorphous silicone and the like.

In addition, suitable resins that can be used in combination with the aforesaid charge generating materials are, for example, thermoplastic binder agents such as saturated polyester resin, polyamide resin, acrylic resin, ethylene-vinyl acetate copolymer, ion-bridged olefin copolymer (ionomer), styrene-butadiene block copolymer, polyarylate, polycarbonate, polyvinyl chloride-acetate copolymer, cellulose esters, polyimide, styrol resin, polyacetal resin, phenoxy resin and the like, thermoset bonding agents such as epoxy resin, urethane resin, silicone resin, phenol resin, melamine resins, xylene resin, alkyd resin, thermoset acrylic resin and the like, and photoelectrically conductive resins such as photoset resin, poly-N-vinyl carbazole, polyvinyl pyrene, polyvinyl anthracene and the like.

The aforesaid charge generating material and resin are dispersed or dissolved in an organic solvent, for example, an alcohol such as methanol, ethanol, isopropanol and the like, ketones such as acetone, methyl ethyl ketone, cyclohexanone and the like, amides such as N,N-dimethylformamide, N,N-dimethylacetoamide and the like, sulfoxides such as dimethyl sulfoxide and the like, ethers such as tetrahydrofuran, dioxane, ethylene glycol monomethyl ether and the like, esters such as methyl acetate, ethyl acetate and the like, aliphatic halogenated hydrocarbons such as chloroform, methylene chloride, dichloroethylene, carbon tetrachloride, trichloroethylene and the like, or aromatics such as benzene, toluene, xylene, ligroin, monochlorobenzene, dichlorobenzene and the like so as to make a photosensitive fluid coating which is applied to the aforesaid electrically conductive substrate and dried thereon so as to form the charge generating layer.

The various methods which may be used to apply the aforesaid fluid coating to the electrically conductive substrate include dip coating, spray coating, spinner coating, blade coating, roller coating, and bar coating methods.

A charge transporting layer is thereafter provided on the charge generating layer formed as described above. A binder agent resin of combined charge transporting material and the aforesaid polycarbonate resins I and II is dissolved in a suitable solvent to produce a coating fluid application which is applied on the aforesaid charge generating layer and dried thereon. The charge transporting layer is formed so as to have a layer thickness of 3 to 40 μm, and preferably has a thickness of 5 to 25 μm. Additionally, the amount of charge transporting material incorporated in said charge transporting layer is 0.02 to 2 parts by weight per 1 part by weight binder resin, and preferably incorporates 0.5 to 1.2 parts by weight per 1 part binder resin. Two or more types of charge transporting materials also may be combined.

Charge transporting materials useful for forming the charge transporting layer are hydrazone compounds, pyrazoline compounds, styryl compounds, triphenyl methane compounds, oxadiazole compounds, carbazole compounds, stilbene compounds, enamine compounds, oxazole compounds, triphenyl amine compounds, tetraphenyl benzidine compounds, azine compounds and the like. More specifically the following charge transporting materials, for example, may be used singly or in mixed combinations of two or more: carbazole, N-ethyl-carbazole, N-vinylcarbazole, N-phenylcarbazole, tetrazene, chrysene, pyrene, perylene, 2-phenylnapthalene, azapyrene, 2,3-benzochrysene, 3,4-benzopyrene, fluorene, 1,2-benzofluorene, 4-(2-fluorenylazo)resorcinol, 2-p-anisole aminofluorene, p-diethylamino azobenzene, Cadione (registered tradename), N,N-dimethyl-p-phenylazoaniline,p-(dimethylamino)-stilbene, 1,4-bis(2-methylstyryl)benzene, 9-(4-diethylaminostyryl-)anthracene, 2,5-bis(4-diethylamino-phenyl)-1,3,5-oxadiazole, 1-phenyl-3-(p-diethyl-aminostyryl)-5-(p-diethylaminophenyl)pyrazoline, 1-phenyl-3-phenyl-5-pyrazolone, 2-(m-naphthyl)-3-phenyl oxazole, 2-(p-diethyl-aminostyryl)-6-diethylaminobenzoxazole, 2-(p-diethylamino-styryl)-6-diethylaminobenzothiazole, bis(4-diethylamino-2-methylphenyl)phenylmethane, 1,1-bis(4-N,N-diethylamino-2-ethylphenyl)heptane, N,N-diphenylhydrazino-3-methylmetyridine-10-ethylphenoxazine, N,N-diphenylhydrazino-3-metyridine-10-ethylphenothiazine, 1,1,2,2-tetrakis-(4-N,N-diethylamino-2-ethylphenyl)ethane, p-diehylaminobenzaldehyde-N,N-diphenylhydrazone, p-diphenylaminobenzaldehyde-N,N-diphenyl-hydrazone, N-ethylcarbazole-N-methyl-N-phenylhydrazone, p-diethylaminobenzaldehyde-N-α-naphthyl-N-phenylhydrazone, p-diethylaminobenzaldehyde-3-methylbenzthiazolinone-2-hydrazone, 2-methyl-4-N,N-diphenylamino-β-phenylstilbene, α-phenyl-4-N,N-diphenylaminostilbene, bisdiethylamino tetraphenylbutadiene and the like.

In addition, the aforesaid electrically conductive substrate and photosensitive layer may have an intermediate layer may be provided therebetween, or said photosensitive layer may be provided a surface protective coating layer as required in the photosensitive member derived from the previously described materials and methods.

The materials used for the aforesaid intermediate layer may be, for example, polymers such as unaltered polyimide, polyamide, nitrocellulose, polyvinyl butyral, polyvinyl alcohol and the like, or the aforesaid compounds with low resistance compounds such as tin oxide, indium oxide and the like dispersed therein, or suitable vacuum deposition layer materials such as aluminum oxide, zinc oxide, silicon oxide and the like. The thickness of said intermediate layer is preferably 1 μm or less.

Suitable materials for use as the surface protective coating are materials having dispersed therein unaltered polymers such as acrylic resins, polyaryl resins, polycarbonate resins, urethane resins and the like, and low resistance compounds such as tin oxide, indium oxide and the like. In addition, an organic plasma polymerization layer may also be used, and may incorporate oxygen, nitrogen and halogen atoms and atoms from Group III and Group V elements of the Periodic Table as required. The aforesaid surface protective coating preferably has a thickness of 5 μm or less.

The present invention is hereinafter described by way of concrete examples, and the superiority of the embodiments of the present invention will become apparent through comparison with reference examples provided for that purpose.

EXAMPLE 1

An aluminum drum having a major diameter of 80 mm and a length of 350 mm was used as the electrically conductive substrate.

First, 0.45 parts by weight bisazo pigment expressed by structural formula 7 below, 0.45 parts polyester resin (Bairon; Toyo Boseki K.K.) and 50 parts cyclohexanone were dispersed by a sand grinder, and the dispersion fluid was applied to the aforesaid aluminum drum by a dipping process so as to form a charge generating layer thereon at a rate of 0.3 $g/m^2$.

[7]

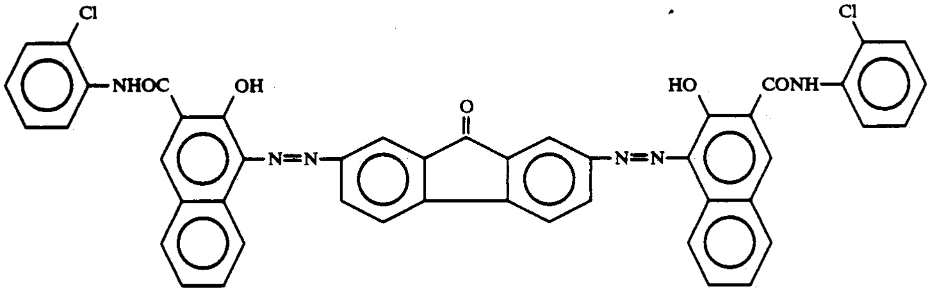

Next, a charge transporting layer was formed over the charge generating layer using a styryl compound expressed by structural formula 8 below as the charge transporting material.

[8]

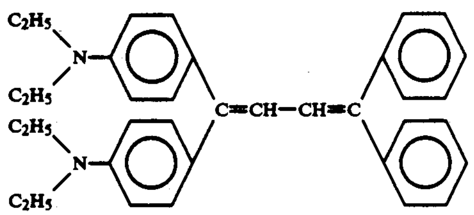

The binder resin used in the formation of the charge transporting layer incorporated repeated units of a linear polymer expressed by the aforesaid general formula 1 as polycarbonate resin I with a mean molecular weight of 24,000, and repeated units of another polymer expressed by general formula 3 as polycarbonate resin II with a mean molecular weight of 45,000.

Then, 70 parts by weight of the aforesaid styryl compound, 25 parts of polycarbonate resin I and 45 parts polycarbonate resin II were dissolved in a solution of 400 parts by weight 1,4-dioxane and 100 parts cyclohexanone. The aforesaid fluid application was applied to the previously described charge generating layer by a dipping method, and dried to form a charge transporting layer thereon having a thickness of 20 μm. A laminate photosensitive member was thus obtained having alternate charge generating and charge transporting layers laminated on an aluminum drum.

In the aforesaid charge transporting layer forming process the viscosity of the aforesaid fluid application was 340 cps, and the aluminum drum was raised at a speed of 54 mm/min.

EXAMPLE 2

In the present embodiment the laminate photosensitive member was produced in substantially the same manner as described in Example 1 with the exception of the charge transporting layer formation process wherein 20 parts by weight of polycarbonate resin I having a mean molecular weight of 29,000 and 50 parts polycarbonate resin II having a mean molecular weight of 41,000 were used.

The fluid application used in the charge transporting layer formation process had a viscosity of 372 cps, and the aluminum drum was raised at a speed of 50 mm/min.

REFERENCE EXAMPLE 1

In the present reference example the laminate photosensitive member was produced in substantially the same manner as described in Example 1 with the exception of the polycarbonate resin used in the formation of the charge transporting layer, which was 70 parts by weight polycarbonate resin having a means molecular weight of 9,000.

The fluid application used in the charge transporting layer formation process had a viscosity of 120 cps, and the aluminum drum was raised at a speed of 90 mm/min.

REFERENCE EXAMPLE 2

In the present reference example the laminate photosensitive member was produced in substantially the same manner as described in Example 1 with the exception of the polycarbonate resin used in the formation of the charge transporting layer, which was 70 parts by weight polycarbonate resin having a mean molecular weight of 73,000.

Because the fluid application used in the charge transporting layer formation process could not be applied at the resulting viscosity of 860 cps, 800 parts by weight of a solvent were added to achieve a viscosity of 420 cps, and the aluminum drum was raised at a speed of 44 mm/min.

REFERENCE EXAMPLE 3

In the present reference example the laminate photosensitive member was produced in substantially the same manner as described in Example 1 with the exception of the polycarbonate resins used in the formation of the charge transporting layer, which were 35 parts by weight polycarbonate resin I with a mean molecular weight of 9,000 and 35 parts polycarbonate resin II with a mean molecular weight of 73,000.

The fluid application used in the charge transporting layer formation process had a viscosity of 470 cps, and the aluminum drum was raised at a speed of 38 mm/min.

REFERENCE EXAMPLE 4

In the present reference example the laminate photosensitive member was produced in substantially the same manner as described in Example 1 with the exception of the polycarbonate resin used in the formation of the charge transporting layer, which was 70 parts by weight polycarbonate resin having a means molecular weight of 24,000.

The fluid application used in the charge transporting layer formation process had a viscosity of 240 cps, and the aluminum drum was raised at a speed of 68 mm/min.

EXAMPLE 3

In the present embodiment charge generating layer was formed on an electrically conductive substrate comprising an aluminum drum having a major diameter of 80 mm and a length of 350 mm. A t-type non-metallic phthalocyanine was used as the charge generating material. One part by weight t-type non-metallic phthalocyanine, 1 part polyvinylbutyral resin (acetylation less than 3 molar %, butylation 68 molar %, degree of polymerization 1,500) and 100 parts cyclohexanone were dispersed by sand grinder to produce a dispersion fluid into which was dipped the aforesaid aluminum substrate to form a charge generating layer thereon having a layer thickness of 0.3 μm.

Next, a charge transporting layer was formed over the charge generating layer using a hydrazone compound expressed by structural formula 9 below.

[9]

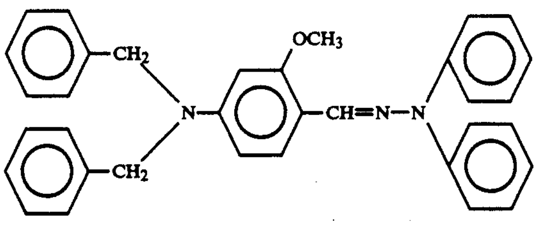

The bonding resin used in the formation of the charge transporting layer incorporated repeated units of a linear polymer expressed by the aforesaid general formula 3 as polycarbonate resin I with a mean molecular weight of 23,000, and repeated units of another polymer expressed by general formula 4 as polycarbonate resin II with a mean molecular weight of 51,000.

Then, 10 parts by weight of the aforesaid hydrazone compound, 3 parts of polycarbonate resin I and 7 parts polycarbonate resin II were dissolved in a solvent comprising 50 parts by weight dioxane and 20 parts tetrahydrofuran. The aforesaid fluid application was applied to the previously described charge generating layer by a dipping method, and dried to form a charge transporting layer thereon having a thickness of 20 μm. A laminate photosensitive member was thus obtained having alternate charge generating and charge transporting layers laminated on an aluminum drum.

In the aforesaid charge transporting layer forming process the viscosity of the aforesaid fluid application was 405 cps, and the aluminum drum was raised at a speed of 54 mm/min.

EXAMPLE 4

In the present embodiment the laminate photosensitive member was produced in substantially the same manner as described in Example 3 with the exception of the polycarbonate resins I and II used in the formation of the charge transporting layer which incorporated repeated units of a linear polymer expressed by the aforesaid general formula 5 as polycarbonate resin I (4 parts by weight) with a mean molecular weight of 35,000, and repeated units of another polymer expressed by general formula 6 as polycarbonate resin II (6 parts by weight) with a mean molecular weight of 63,000.

The fluid application used in the charge transporting layer formation process had a viscosity of 410 cps, and the aluminum drum was raised at a speed of 46 mm/min.

EXAMPLE 5

In the present embodiment the laminate photosensitive member was produced in substantially the same manner as described in Example 3 with the exception of the polycarbonate resins I and II used in the formation of the charge transporting layer which incorporated repeated units of a linear polymer expressed by the aforesaid general formula 3 as polycarbonate resin I (3 parts by weight) with a mean molecular weight of 30,000, and repeated units of another polymer expressed by general formula 3 as polycarbonate resin II (6 parts by weight) with a mean molecular weight of 40,000.

The fluid application used in the charge transporting layer formation process had a viscosity of 314 cps, and the aluminum drum was raised at a speed of 57 mm/min.

Thereafter, differences in layer thickness were measured on the top and bottom (2 cm from either end) of each photosensitive member produced as described above.

Further, each of the aforesaid photosensitive members were installed in an electrophotographic copy machine (EP-470Z, Minolta Camera Company, Ltd.), corona charged at −6 kV, and subjected to the copying process. Initial image characteristics and those after 10,000 copies were evaluated for each photosensitive member.

Finally, the quantity of layer lost after 10,000 copies was measured for each photosensitive member.

The results of these investigations are shown in Table 1.

TABLE 1

| | Image char. initial | Image char. after 10,000 | Difference layer thickness (μm) | Amount loss (μm) |
|---|---|---|---|---|
| Ex. 1 | Excellent | Excellent | 1.2 | 0.3 |
| Ex. 2 | Excellent | Excellent | 1.1 | 0.2 |
| Ref. 1 | Irregular density | Irregular density | 5.8 | 1.6 |
| Ref. 2 | Irreg density Black spots | Irreg density Black spots | 1.2 | 0.2 |
| Ref. 3 | Excellent | Irreg density White streaks | 1.3 | 0.9 |
| Ref. 4 | Fair | Irreg density White streaks | 1.7 | 0.5 |
| Ex. 3 | Excellent | Excellent | 1.3 | 0.3 |
| Ex. 4 | Excellent | Excellent | 1.0 | 0.2 |
| Ex. 5 | Excellent | Excellent | 0.9 | 0.2 |

As the results shown in Table 1 clearly indicate, the laminate photosensitive member of the present invention possesses superior image characteristics both initially and after 10,000 copies in comparison with the reference examples. Further, there was generally very little difference in layer thickness or loss quantity on the top and bottom of the photosensitive member.

Although the present invention has been described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claim is:

1. A photosensitive member comprising:

an electrically conductive substrate;

a charge generating layer;

a charge transporting layer containing at least a charge transporting material, a polycarbonate resin I of first type having a mean molecular weight of $2\text{–}4\times10^4$ and a polycarbonate resin II of second type having a mean molecular weight of $4\text{–}6.5\times10^4$, said polycarbonate resin I contributing between 5 and 50 parts by weight of the combined ratio of polycarbonate resins I and II.

2. A photosensitive member as claimed in claim 1 wherein the charge transporting layer is formed so as to have a layer thickness of 3 to 40 μm.

3. A photosensitive member as claimed in claim 2 wherein the charge transporting layer is formed so as to have a layer thickness of 5 to 25 μm.

4. A photosensitive member as claimed in claim 1 wherein the amount of charge transporting material incorporated in said charge transporting layer is 0.02 to 2 parts by weight per 1 part by weight of said polycarbonate resins I and II.

5. A photosensitive member as claimed in claim 4 wherein the amount of charge transporting material incorporated in said charge transporting layer is 0.5 to 1.2 parts by weight per 1 part by weight of said polycarbonate resins I and II.

6. A photosensitive member as claimed in claim 1 wherein the charge transporting material is styryl compound or hydrazone compound.

7. A photosensitive member comprising:

an electrically conductive substrate;

a charge generating layer;

a charge transporting layer containing at least a charge transporting material, a polycarbonate resin I of first type having a means molecular weight of $2–4\times10^4$ and a polycarbonate resin II of second type having a mean molecular weight of $4–6.5\times10^4$, said polycarbonate resin I contributing between 5 and 50 parts by weight of the combined ratio of polycarbonate resins I and II and a difference in means molecular weights of said polycarbonate resins I and II used in combination being $3\times10^4$ or less.

8. A photosensitive member as claimed in claim 7 wherein the charge transporting layer is formed so as to have a layer thickness of 3 to 40 μm.

9. A photosensitive member as claimed in claim 8 wherein the charge transporting layer is formed so as to have a layer thickness of 5 to 25 μm.

10. A photosensitive member as claimed in claim 7 wherein the amount of charge transporting material incorporated in said charge transporting layer is 0.02 to 2 parts by weight per 1 part by weight of said polycarbonate resins I and II.

11. A photosensitive member as claimed in claim 10 wherein the amount of charge transporting material incorporated in said charge transporting layer is 0.5 to 1.2 parts by weight per 1 part by weight of said polycarbonate resins I and II.

12. A photosensitive member as claimed in claim 7 wherein the charge transporting material is styryl compound or hydrazone compound.

13. A photosensitive member comprising:

an electrically conductive substrate;

a charge generating layer;

a charge transporting layer containing at least a charge transporting material, a polycarbonate resin I of first type having a mean molecular weight of $2–4\times10^4$ and a polycarbonate resin II of second type having a mean molecular weight of $4–6.5\times10^4$, said polycarbonate resin I contributing between 5 and 50 parts by weight of the combined ratio of polycarbonate resins I and II, wherein said polycarbonate resins I and II are represented by the formula I:

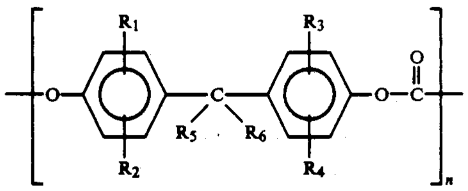

[1]

wherein R1, R2, R3 and R4 are hydrogen atoms, halogen atoms, alkyl radicals, or alkyl radicals, R5 and R6 are hydrogen atoms, alkyl radicals or aromatic groups and R5 and R6 can with the carbon atom from which they depend, form single cyclic structures;

and wherein n of the polycarbonate resin I is different than that of the polycarbonate resin II.

* * * * *

UNITED STATES PATENT AND TRADEMARK OFFICE
CERTIFICATE OF CORRECTION

PATENT NO. : 4,988,571

DATED : January 29, 1991

INVENTOR(S) : Hideaki Ueda

It is certified that error appears in the above-identified patent and that said Letters Patent is hereby corrected as shown below:

On the title page, in item [75], change the inventor's name to read:

-- Hideaki UEDA --

Signed and Sealed this

Ninth Day of June, 1992

*Attest:*

DOUGLAS B. COMER

*Attesting Officer*

*Acting Commissioner of Patents and Trademarks*